United States Patent
Lutz

(10) Patent No.: US 10,761,521 B2
(45) Date of Patent: Sep. 1, 2020

(54) ENGINEERING SYSTEM

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 15/963,644

(22) Filed: Apr. 26, 2018

(65) Prior Publication Data

US 2018/0314239 A1    Nov. 1, 2018

(30) Foreign Application Priority Data

Apr. 28, 2017   (EP) .................................... 17168781

(51) Int. Cl.
*G05B 19/418*   (2006.01)
*G05B 19/042*   (2006.01)

(52) U.S. Cl.
CPC ..... *G05B 19/4188* (2013.01); *G05B 19/0426* (2013.01); *G05B 2219/40444* (2013.01)

(58) Field of Classification Search
None
See application file for complete search history.

(56) References Cited

U.S. PATENT DOCUMENTS

| | | | | |
|---|---|---|---|---|
| 5,812,394 A * | 9/1998 | Lewis | ................ | G05B 19/0426 700/17 |
| 7,149,730 B2 * | 12/2006 | Mullins | ................ | G06F 16/289 |
| 8,448,156 B2 * | 5/2013 | Demetriou | ................ | G06F 8/45 717/136 |
| 8,473,922 B2 * | 6/2013 | Li | ....................... | G06F 11/3612 709/201 |
| 8,584,099 B1 * | 11/2013 | Abi-Antoun | ............. | G06F 8/74 717/131 |
| 9,547,291 B2 * | 1/2017 | Tran | ...................... | G05B 15/02 |
| 2005/0159932 A1 * | 7/2005 | Thurner | ............ | G05B 19/0426 703/2 |
| 2006/0101346 A1 * | 5/2006 | Denzlein | ............ | G05B 19/0426 715/762 |
| 2007/0028208 A1 * | 2/2007 | Maki | ........................ | G06F 8/30 717/106 |

(Continued)

FOREIGN PATENT DOCUMENTS

EP   3001310   3/2016

OTHER PUBLICATIONS

Katalog STP CS 7T 2016, Siemens-Katalog, ST PCT 7 T, Edition 2016.

*Primary Examiner* — Ramesh B Patel
(74) *Attorney, Agent, or Firm* — Cozen O'Connor

(57) ABSTRACT

An engineering system for planning an automation entity, wherein the engineering system is configured to store and display first objects for at least one automation device and second objects for at least one operator system in a structured manner in accordance with a technological hierarchy, and to generate from the first objects first runtime data for loading into the automation device and from the second objects second runtime data for loading into the operator system, and wherein components of the first runtime data are operatively connected to components of the second runtime data such that it is possible to distinguish between a planning error and the consequences of a delta loading of runtime data.

4 Claims, 4 Drawing Sheets

| Object | Runtime Data | Device | Effect Preview | Selection for Delta |
|---|---|---|---|---|
| HMITank1 | Configuration | OS1 | →(Open) | ✓ |
| Monans_9 | Process Image | OS1 | | |
| | FB | AS1 | | |
| CFCTank1 | Configuration | AS1 | →(Open) | |
| CFCVisuTank1 | Configuration | OS1 | →(Open) | ✓ — 15a |
| HMIControl | Configuration | OS1 | →(Open) | ✓ — 15b |
| | Display Hierarchy | OS1 | →(Open) | ✓ — 15c |
| | Display Hierarchy | OS2 | →(Open) | |
| | | | | |
| | | | | |

Columns labeled 9, 10, 11, 12, 13; table labeled 8.

(56) References Cited

U.S. PATENT DOCUMENTS

| | | | |
|---|---|---|---|
| 2007/0129917 A1* | 6/2007 | Blevins | G05B 17/02 |
| | | | 703/6 |
| 2007/0168065 A1* | 7/2007 | Nixon | G06Q 50/04 |
| | | | 700/83 |
| 2008/0195963 A1* | 8/2008 | Eisen | G06Q 10/06 |
| | | | 715/772 |
| 2013/0131840 A1* | 5/2013 | Govindaraj | G05B 19/41865 |
| | | | 700/19 |
| 2015/0105875 A1* | 4/2015 | Tran | G05B 15/02 |
| | | | 700/83 |
| 2016/0154910 A1* | 6/2016 | Altare | G06Q 10/06 |
| | | | 703/13 |
| 2016/0154911 A1* | 6/2016 | Altare | G06Q 10/06 |
| | | | 703/13 |
| 2016/0154912 A1* | 6/2016 | Altare | G06Q 10/06 |
| | | | 703/13 |
| 2016/0154913 A1* | 6/2016 | Altare | G06Q 10/06 |
| | | | 703/13 |

\* cited by examiner

ENGINEERING SYSTEM

BACKGROUND OF THE INVENTION

1. Field of the Invention

The invention relates to an engineering system for planning an automation entity, where the engineering system is configured to store and display first objects for at least one automation device and second objects for at least one operator system in a structured manner in accordance with a technological hierarchy, and to generate from the first objects first runtime data for loading into the automation device and from the second objects second runtime data for loading into the operator system, and where components of the first runtime data are operatively connected to components of the second runtime data.

2. Description of the Related Art

Siemens Catalog ST PCS 7, Edition 2016, Chapter 4 discloses an engineering system for a process control system that is used to control a technical plant. Such an engineering system is suitable for "engineering" an automation entity and is designed or constructed for the purpose of planning and/or configuring hardware and/or software components, communication networks, automation functionalities for continuous and sequential process flows (AS engineering), and operating and monitoring functionalities (OS engineering).

An essential property of a control system for process control or for controlling process plants is a "delta loading compatibility" during the process control, which allows the control system to continue to operate in spite of a change or modification to the planning data. Architectures of such control systems are usually heterogeneous and complex, each level (field level, control level, etc.) of the control system having its own technologies and configurations that must be loaded during a delta update. For example, if a new process object in the form of a regulator module is entered, it is then necessary, e.g., in the context of a delta update or delta loading to load a CFC regulator module into the control program of the automation device, the data structure of the regulator module into the process image of the operator system, the symbols of the regulator module into the plant diagrams of the visual depiction, and addressing information of the regulator module into further operator systems. In this case, the situation may occur in which, during the delta update, e.g., the data structure of the regulator module is not yet loaded into the process image of the operator system. This means that even though the diagrammatic symbol of the regulator module is displayed in a plant diagram that can be represented on the operator system, this diagrammatic symbol is however not "dynamized", i.e., neither the current parameters of the regulator nor the current desired/actual values of the regulator are displayed, which indicates a planning error even though no such planning error is present. This misinterpretation ("side effect" or consequence) during the delta loading is disruptive in the context of an activation, for example.

SUMMARY OF THE INVENTION

In view of the foregoing, it is therefore an object of the invention to provide an engineering system that allows a user to distinguish between a planning error and the consequences of a delta loading of runtime data.

This and other objects and advantages are achieved in accordance with the invention by an engineering system that is configured to generate, from objects displayed in a technological hierarchy (1) and selected by a user, a table or overview display containing selected objects and showing the user which components of the first runtime data are operatively connected to which components of the second runtime data, and configured to load at least one of (i) components of the first runtime data of the components selected by the user in the table or the overview display into the automation device and (ii) components of the second runtime data of the components selected by the user in the table or the overview display into the operator system.

It is advantageous, particularly in the context of an activation of new automation functionalities, that a planner at runtime can limit the changes with respect to the delta loading in a highly specific manner to individual devices. If all of the runtime objects to be loaded are not selected during the course of a step-by-step activation, then the planner can see the anticipated side-effects displayed in advance during the engineering, such that it is possible to distinguish between a side-effect and a planning error at runtime. Furthermore, the planner can selectively accept changes until undesired side-effects no longer occur. The activation of new automation functionalities can be performed more effectively and with minimal error, where the planner is able to limit the loading to the plant diagrams first, in order to allow step-by-step loading, testing and "rollback" if applicable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in the following with reference to the drawing, in which an exemplary embodiment of the invention is illustrated, in which.

DETAILED DESCRIPTION OF THE EXEMPLARY EMBODIMENTS

Identical parts in the FIGS. 1 to 4 are denoted by identical reference signs.

Process objects of a technical plant that is to be controlled, e.g., process objects in the form of measuring points, tanks, valves, sensors, actuators, continuous function charts (CFCs) and sequential function charts (SFCs) for automation devices or programmable logic controllers, etc., are structured in a technological hierarchy, e.g., an "equipment hierarchy" (EQH), where the equipment hierarchy is created by a user via suitable software of an engineering system when an automation entity is planned. The equipment hierarchy thus created is then compiled via the engineering system, and the runtime objects that have been generated are loaded into the automation devices and into operator servers of operator systems of the automation entity, where the equipment hierarchy is used as a central reference point, e.g., for a batch process or for navigating or determining a process object within the equipment hierarchy, at runtime of the operator systems or process control system.

Figure 1:
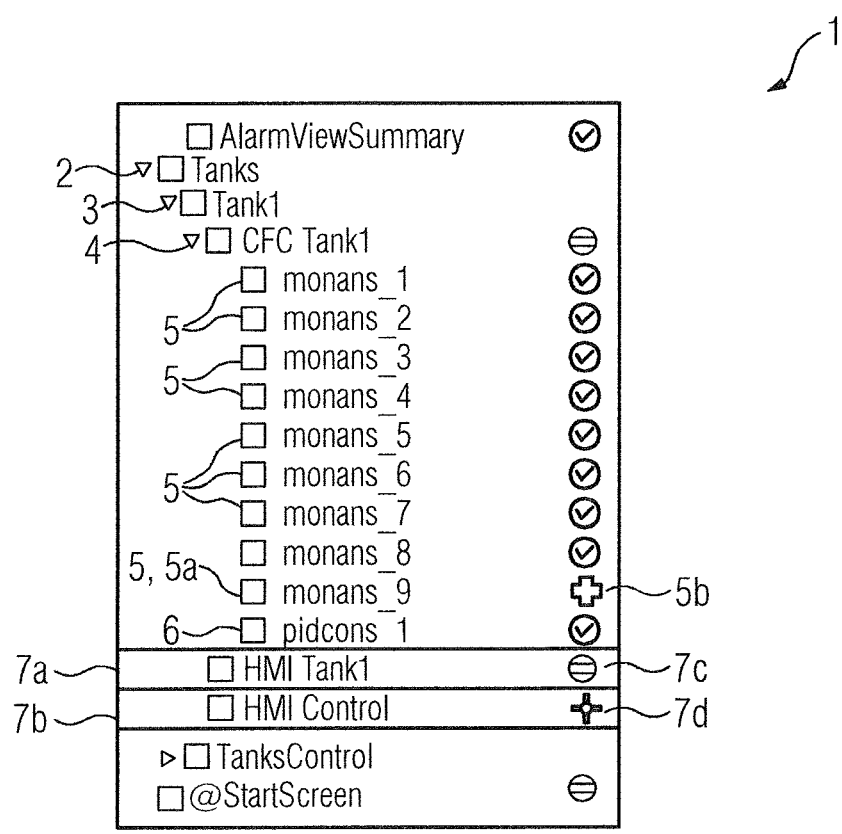
FIG. 1 shows an equipment hierarchy represented on a display in accordance with the invention.

In the present exemplary embodiment, numeral 1 in FIG. 1 designates an equipment hierarchy having a multiplicity of folders and subfolders. For example, a folder 2 (Tanks) has a subfolder 3 (Tank1), whose stored contents (CFC plan 4; monitor and regulator modules 5, 6 of the CFC plan 4; plant diagrams 7*a*, 7*b*) are shown on a display unit of an engineering system that includes a processor and memory, where the CFC plan 4 and its modules 5 represent objects of at least one automation device and the plant diagrams 7 represent objects of at least one operator system.

In order to initiate a selective delta loading in the engineering system, a user first selects the objects in the equipment hierarchy 1 that are to be loaded (new and/or modified objects). In the present example, it is assumed that the CFC plan 4 of the equipment hierarchy 1 has been supplemented by a monitor module 5*a* ("monans_9") and an existing or previously planned plant diagram 7*a* ("HMITank1") has been supplemented by a module symbol or diagrammatic symbol of the monitor module, and that a newly planned plant diagram 7*b* ("HMIControl") has been entered, where the user or planner selects the plant diagrams 7*a*, 7*b* ("HMITank1", "HMIControl") for a pending delta loading. On the display unit of the engineering system, the new monitor module 5*a* ("monans_9") is indicated by an identification mark 5*b* and the selection of the plant diagrams 7*a*, 7*b* ("HMITank1", "HMIControl") by identification marks 7*c*, 7*d*.

Based on the selected plant diagrams "HMITank1", "HMIControl" in the equipment hierarchy 1, the engineering system generates a tabular detailed view, where a service of the engineering system determines the dependencies and associations of runtime data generated from the objects. This means that the service determines those components of the runtime data of the at least one automation device and those components of the runtime data of the at least one operator system that are operatively connected to each other, where the dependencies and associations or operative connections are shown on the display unit of the engineering system. This service also determines "secondary" runtime data that is generated based on the CFC plan 4 that has been supplemented by the monitor module "monans_9", no objects being visible in the equipment hierarchy 1 for this secondary runtime data.

Figure 2:
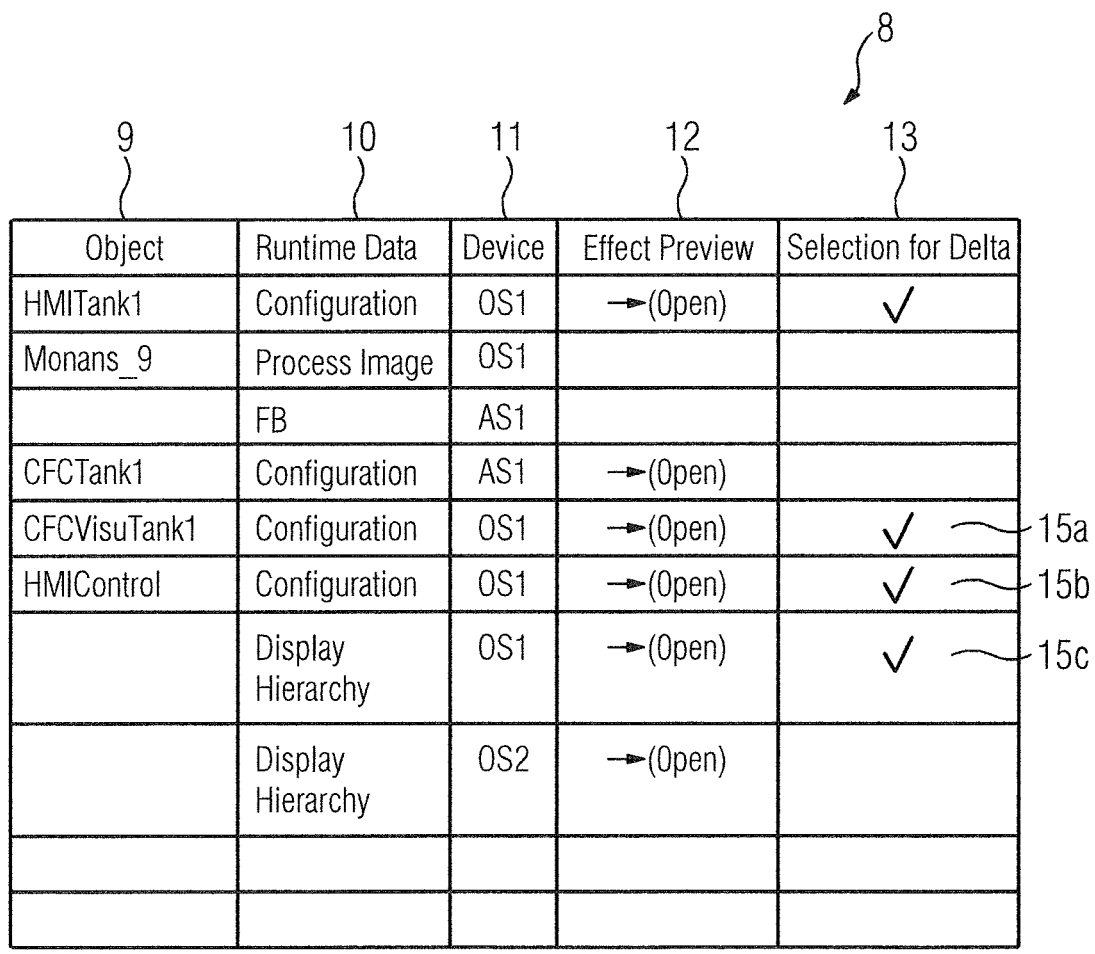
FIG. 2 shows an overview display with objects and runtime data in accordance with the invention.

FIG. 2 illustrates the dependencies and associations in a tabular detailed view 8. Column 9 lists the objects that are contained in the equipment hierarchy 1 and are relevant for a selective delta loading due to the change in which the CFC plan 4 was supplemented by the monitor module "monans_9", where column 10 displays the runtime data belonging to these objects and also the secondary runtime data (configurations) affected by the change or supplement. This column 10 (Runtime Data) lists all of the required configurations (going beyond the object level) for the respective objects. For example, for the new plant diagram "HMIControl", in addition to the actual configuration of the plant diagram, an update of a "Display Hierarchy" on operator systems (operator systems "OS1", "OS2" in the example) is also required for a corresponding addressing of the plant diagram. A column 11 (Device) lists the devices (automation device "AS1", operator systems "OS1", "OS2") that are affected in the event of a corresponding selection of a selective delta loading of the runtime data. In column 12, an object-related preview (Effect Preview) can be opened that visually depicts the respective "side-effects" based on a current delta selection. In column 13, the user or planner can specify the selection (indicated by check marks 15*a*, 15*b*, 15*c*) for the next delta loading. With such a dedicated selection, the planner can now limit the consequences of a delta loading for the activation, e.g., to the operator system "OS1", and thereby evaluate each anticipated effect in advance. It is therefore possible to avoid negative consequences on other devices in the context of the activation.

Figure 3:
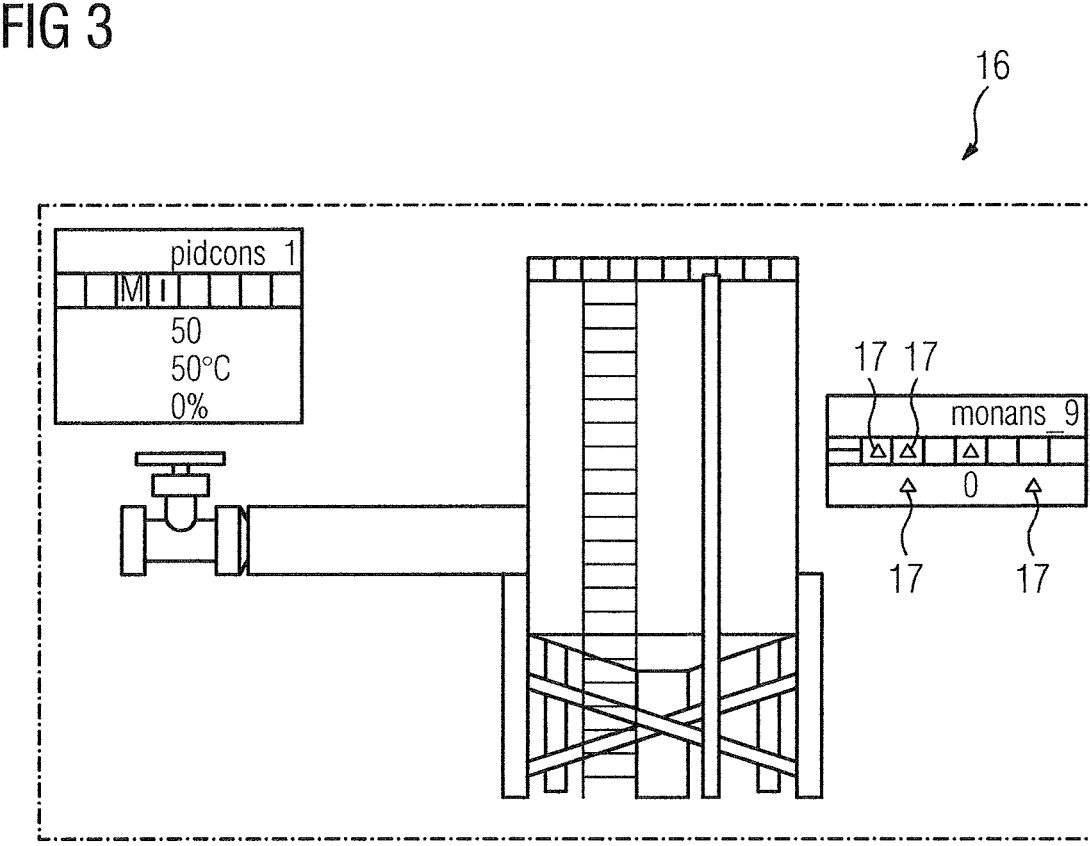
FIGS. 3 and 4 show preview diagrams of a tank and a continuous chart function (CFC) plan in accordance with the invention.

The following makes reference to FIG. 3, in which a modified preview document 16 (Effect Preview) that has been generated by the engineering system is shown for the plant diagram 7*a* labeled "HMITank1", illustrating how a delta selection takes effect in the context of an activation at runtime and which "side-effects" are to be expected. The preview document 16 is static and shows qualitatively the anticipated effects based on the current configuration of the objects and the delta selection.

As a result of the selection by the user (indicated by the check marks 15*a*, 15*b*, 15*c*), the modified plant diagram ("HMITank1") labeled 7*a* is loaded onto the operator system "OS1", but the new diagrammatic symbol for the monitor module 5*a* ("monans_9") cannot by dynamized because the user has failed, for the delta loading, to designate (or select in column 13) both a process image on the operator system ("OS1") and a function module "FB" of the automation device ("AS1") for the monitor module 5*a* ("monans_9"). In the present example, the missing dynamization is indicated to the user by warning triangles 17. It is therefore clear to the user how the selection takes effect at runtime, such that no confusion with planning errors can occur in the context of the activation.

Figure 4:
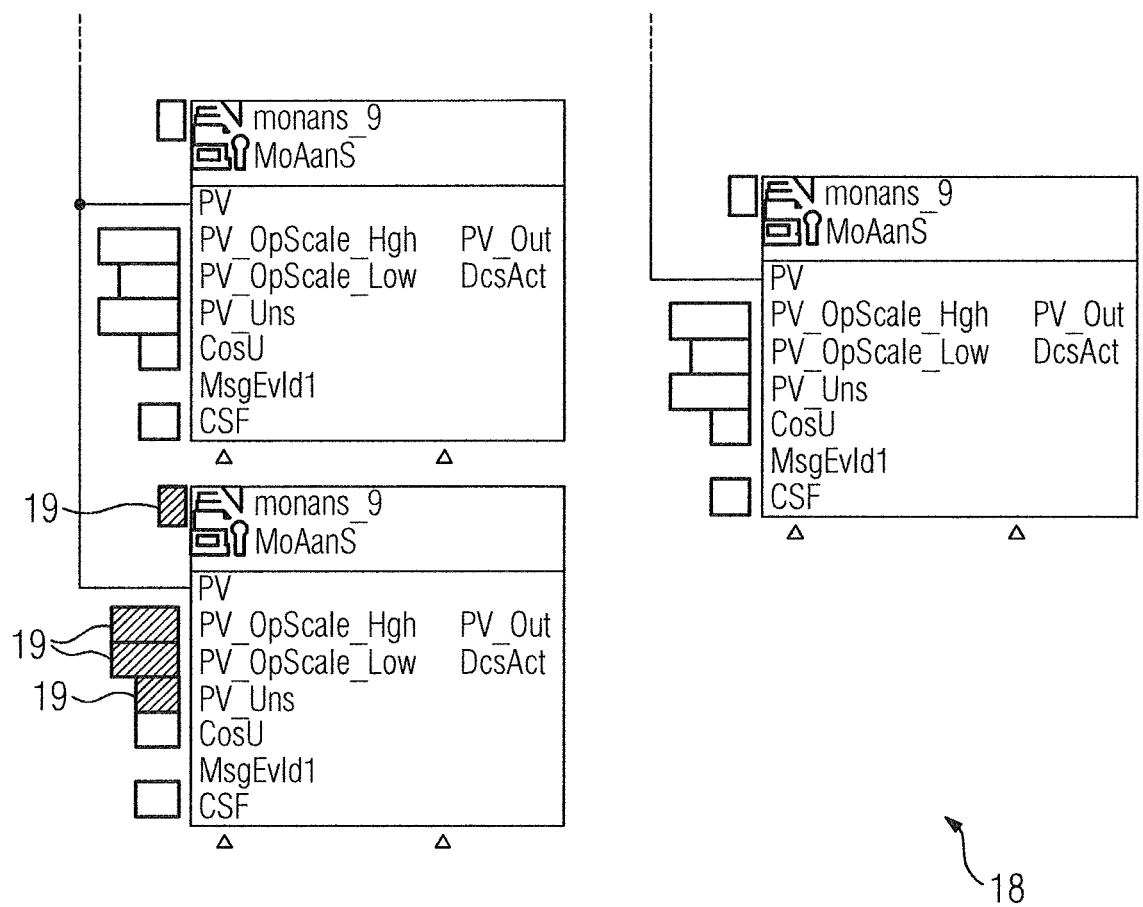

FIG. 4 shows a preview diagram 18 of a visually depicted object labeled "CFCVisuTank1" of the CFC plan 4 labeled "CFCTank1", as presented to the user on the display unit as a result of the selection. The visually depicted CFC plan 4 is selectively loaded into the operator system "OS1" (check mark 15*a*, column 13), but because no selective update containing the new monitor module 5*a* of the object "CFCTank1" is specified, the monitor module "monans_9" is not dynamized correspondingly in a visual depiction, this being indicated to the user by markings 19 against this module. The user or planner is thus made aware of the side-effects in the context of an activation, for example, where the planner is then able to make further selections to avoid such side-effects.

The measures described here make it possible to effect a step-by-step activation, allowing the selection of objects and configurations to be loaded, such that the anticipated side-effects can be indicated in advance during the engineering. It is thereby possible to distinguish between a side-effect and a planning error at runtime. Furthermore, a user can selectively accept changes until undesired side-effects no longer occur. With a dependency-oriented, "side-effect-aware", selective and delta-compatible loading, the activation of new automation functionality can be performed more effectively and with minimal error.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those structures and/or elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An engineering system for planning an automation entity, the system comprising:
    a processor including memory; and
    at least one display;
    wherein the engineering system is configured to:
        store in the memory and display on the a least one display first objects for at least one automation device and second objects for at least one operator system in a structured manner in accordance with a technological hierarchy;
        generate from the first object, via the processor, first runtime data for loading into the automation device and from the second objects, via the processor, second runtime data for loading into the operator system, components of the first runtime data being operatively connected to components of the second runtime data;
    wherein the engineering system is further configured to:
        generate, from objects displayed in the technological hierarchy and selected by a user, via the processor, a table or overview display containing selected objects and showing the user which components of the first runtime data are operatively connected to which components of the second runtime data;
        load, from the memory, at least one of (i) components of the first runtime data of the components selected by the user in the table or the overview display into the automation device and (ii) components of the second runtime data of the components selected by the user in the table or the overview display into the at least one operator system; and
    wherein changes with respect to a delta loading are limited to individual devices during activation of new automation functionalities at runtime such that anticipated side-effects are displayed in advance during planning of the automation entity.

2. The engineering system as claimed in claim 1, wherein the table or overview display shows whether the selection takes effect on at least one of (i) the at least one automation device and (ii) the at least one operator system.

3. An arrangement comprising the engineering system as claimed in claim 1 and an operator system, wherein a selection which takes effect on the operator system is displayed on the operator system.

4. An arrangement comprising the engineering system as claimed in claim 2 and an operator system, wherein a selection which takes effect on the operator system is displayed on the operator system.

* * * * *